United States Patent
Plett

[19]

[11] Patent Number: 5,873,447
[45] Date of Patent: Feb. 23, 1999

[54] HYDRAULIC CYLINDER FOR GRAIN AUGERS

[76] Inventor: Benjamin Plett, Box 39, Rosenort, Manitoba, Canada, R0G 1W0

[21] Appl. No.: 826,657

[22] Filed: Apr. 7, 1997

[30] Foreign Application Priority Data

Dec. 9, 1996 [CA] Canada .................................. 2185377

[51] Int. Cl.⁶ .................................................. B65G 21/00
[52] U.S. Cl. .................................... 198/316.1; 198/861.5; 198/318; 187/273; 91/422
[58] Field of Search ................. 198/316.1, 318, 198/320, 861.5; 187/272, 273, 274; 91/422

[56] References Cited

U.S. PATENT DOCUMENTS

| | | | |
|---|---|---|---|
| 2,856,062 | 10/1958 | Kling | 198/316.1 |
| 2,880,707 | 4/1959 | McCarthy . | |
| 3,147,671 | 9/1964 | Geyer . | |
| 3,394,634 | 7/1968 | Pfundt . | |
| 3,476,016 | 11/1969 | Dixon et al. | 91/422 |
| 3,552,546 | 1/1971 | Rath . | |
| 3,563,364 | 2/1971 | Arndt et al. | 198/316.1 |
| 4,206,839 | 6/1980 | Young . | |
| 4,266,909 | 5/1981 | Langenfeld et al. | 91/422 |
| 4,359,207 | 11/1982 | Maryonovich et al. . | |
| 4,367,814 | 1/1983 | Young . | |
| 4,512,687 | 4/1985 | Enns | 198/318 |
| 4,739,868 | 4/1988 | Head | 198/316.1 |
| 5,165,512 | 11/1992 | Driear | 198/861.5 |

*Primary Examiner*—Joseph E. Valenza
*Assistant Examiner*—Patrick Mackey
*Attorney, Agent, or Firm*—Robert W. B. Bailey

[57] ABSTRACT

A grain elevator auger uses a hydraulic cylinder incorporating a checkvalve. This checkvalve enables the volume of hydraulic fluid required to raise the elevator to be reduced to that required to replace the extended piston rod, instead of the full volume of the cylinder. The necessary capacity of the tractor hydraulic system reservoirs which are used to raise the elevators are similarly lessened. The checkvalve prevents hydraulic pressure retracting the piston, pressure is equalized on both sides of the cylinder piston, which then retracts slowly under the weight of the elevator, rather than rapidly under hydraulic pressure.

19 Claims, 7 Drawing Sheets

HYDRAULIC CYLINDER FOR GRAIN AUGERS

This invention relates to a single acting hydraulic cylinder for hydraulic lift systems for grain augers. A checkvalve is incorporated into a double acting hydraulic cylinder, which allows it to provide force in one direction only.

Although the invention is described and referred to specifically as it relates to specific structures of hydraulic cylinders, used in specific lifting systems for grain augers, it will be understood that the principles of this invention are equally applicable to similar structures and accordingly, it will be understood that the invention is not limited to such structures.

BACKGROUND OF INVENTION

Grain augers are used primarily to load grain into storage bins, and are typically powered by the PTO (power take off) of a tractor. The hydraulic lifting system of the grain auger is similarly powered by the hydraulic system of the tractor. Basically the auger is transported on a carriage usually consisting of one or more commonly two frames each of two legs, one frame being pivotally mounted on the other, which is supported by the axle of the carriage. When one frame is used it is pivotally mounted on the auger with a hydraulic cylinder pivotally mounted forward of the frame between the frame and the auger, by extending the cylinder the angle between frame and the forward portion of the auger is increased elevating the auger. When two frames are used several arrangements are available. One version has one frame fixedly and pivotally mounted on the auger, the other frame is slidably and pivotally mounted on the auger. By altering the distance between the fixed and slidable mountings the angle of the auger and its height can be adjusted. Cables connect the slidable mounting to one or more hydraulic cylinders, and movement of the piston of the cylinder is used to move the slidable mounting and thus change angle and height of the grain auger. In this system the cylinder(s) or rather the associated piston(s) are extended to shorten the distance between the mountings. Other versions comprise the rear frame fixedly and pivotally mounted on the auger, with the front frame pivotally and fixedly mounted on the auger and on the rear frame, and an intervening pivot in the front frame, joining the upper front frame and the lower front frame. A hydraulic cylinder or cylinders are pivotally mounted either between the auger and the upper front frame, or between the upper and lower front frames, so that extension of the cylinder effectively straightens and lengthens the front frame as a whole elevating the auger.

PRIOR ART

Checkvalves of various types are known in association with hydraulic cylinders. U.S. Pat. No. 2,880,707, issued Apr. 7, 1959, to McCarthy teaches a dual cylinder sequential extension-retraction system with two way checkvalves. U.S. Pat. No. 3,147,671 issued Sep. 8, 1964, to Geyer teaches a one way checkvalve to reduce compressive tension on a hollow piston rod in a hydraulic cylinder for aircraft. U.S. Pat. No. 3,394,634 issued Jul. 30, 1968, to Pfundt teaches a one way checkvalve to relieve excess pressure during retraction. U.S. Pat. No. 3,476,016 issued Nov. 4, 1969, to Dixon teaches a double cylinder system using one way checkvalves, when the valves are open the pressure is equalized, but force is not due to the piston rods; when the valves are closed equal pressure is exerted on both pistons, which thus have coordinated movement. U.S. Pat. No. 3,552,546 issued Jan. 5, 1971, to Rath an extendible retractable belt conveyor using hydraulic cylinders to extend legs and the conveyor itself. U.S. Pat. No. 4,206,839 issued Jun. 10, 1980, and U.S. Pat. No. 4,367,814 issued Jan. 11, 1983 to Young teaches a grain auger raised and lowered by cables and a hydraulically operated winch. U.S. Pat. No. 4,359,207 issued Nov. 16, 1992, to Maryonovich et al., teaches a winch cable system for raising a grain auger and a secondary safety cable system in case of failure.

The previous system used by applicant worked as follows, one or more hydraulic cylinders are connected on the piston side to the tractor hydraulic system and vented on the rod side. To extend the cylinder hydraulic fluid is pumped into the piston side, pushing the piston upward until the cylinder is filled with hydraulic fluid and the air initially on the rod side vented through the air vent. To lower the piston the hydraulic pressure is released and the weight of the auger pushes the piston downward forcing hydraulic fluid from the cylinder. Under this system the hydraulic system of the tractor stores all the hydraulic fluid pumped during operation into the cylinder(s). The tractor hydraulic system must contain enough hydraulic fluid to fill the cylinder(s), which prevents many tractors with smaller hydraulic fluid reservoirs from operating grain augers especially those with larger hydraulic cylinders. There is thus a need to reduce the volume of hydraulic fluid required from the tractor reservoir to operate the system, so that tractors with smaller reservoirs can be used.

It is a principal object of the invention to reduce the volume of hydraulic fluid, especially tractor hydraulic fluid required to operate a long single acting hydraulic cylinder, or cylinders. It is a further principal object of the invention to reduce the volume of hydraulic fluid, especially tractor hydraulic fluid, required to operate a long single acting hydraulic cylinder, or cylinders for grain augers. It is a further principal object of the invention to provide an internal checkvalve to achieve these ends. It is a further principal object to provide an internal checkvalve to prevent tampering by those unfamiliar with the design. It is a further principal object to provide an internal checkvalve to reduce the chance of incorrect assembly. Other objects will be apparent to those skilled in the art from the following specification, accompanying drawings and appended claims.

DESCRIPTION OF THE INVENTION

In one broad aspect the invention is directed to an improved height adjustable elevator means, which has elongated conveyor means to convey material and carriage means to support the conveyor means. The carriage means has front and rear frame members pivotally attached together adjacent their bases, and pivotally attached at their upper ends to the conveyor means. The upper ends of the front and rear frame members are movable toward and away from each other. There are flexible cable means attached at one end to one frame member adjacent the upper end thereof to draw the upper ends of the frame members toward each other to raise the conveyor means. Also it allows the upper ends of the frame members to move away from each other to lower the conveyor means. The flexible cable means is attached at the other end to hydraulic cylinder means having head and rod ends, and reciprocable piston means having associated piston rod means and operatively associated hydraulic line means attachable to vehicle hydraulic system means. The improvement provides piston means including checkvalve means preventing flow through the piston means from head side to rod side allowing head side hydraulic pressure to extend the cylinder, and allowing flow from rod side, which is full of hydraulic fluid, to head side preventing rod side hydraulic pressure retracting the cylinder, whereby the extra volume of hydraulic fluid necessary to extend the cylinder approximates that of the piston rod means. Preferably the carriage means includes a traversing frame member and a fixed frame member. The lower end of the traversing frame member is pivotally attached to the lower end of the fixed frame member, and the upper end of the fixed frame member is fixedly pivotally attached to the conveyor means, while the upper end of the traversing frame member is pivotally attached to the conveyor means in longitudinally movable supporting contact. Preferably the traversing frame member comprises lower frame means and pivotally attached shoe means slidably mounted in longitudinal track means on the conveyor means, and the flexible cable means is attached to the shoe means. Alternatively the traversing frame member comprises lower frame means, lift assist means, and shoe means slidably mounted in longitudinal track means on the conveyor means, the lift assist means is pivotally attached to the shoe means and independently pivotally attached to the lower frame means, while the flexible cable means is attached to the lift assist means. Conveniently there are two flexible cable means attached at one end to one end of the frame member, and each flexible cable means is attached at the other end to separate hydraulic cylinder means.

In another broad aspect the invention is directed to an improved hydraulic cylinder means having head and rod ends, and reciprocable piston means having associated piston rod means and operatively associated hydraulic line means attachable to vehicle hydraulic system means. The improvement provides the piston means including checkvalve means preventing flow through the piston means from head side to rod side allowing head side hydraulic pressure to extend the cylinder, and allowing flow from rod side to head side, which prevents rod side hydraulic pressure alone retracting the cylinder, whereby the extra volume of hydraulic fluid necessary to extend the cylinder approximates that of the piston rod means. Preferably the checkvalve means is spring biased one way checkvalve means.

Desirably these hydraulic cylinder means are incorporated into height adjustable elevator means having elongated conveyor means to convey material and carriage means to support the elevator means having a frame member pivotally attached at its upper end to the conveyor means. One end of hydraulic cylinder means is attached to the portion of the conveyor means in front of the paired frame members, and the other end is operatively associated with the frame member spaced apart from the conveyor means, so that when the hydraulic cylinder means is extended the angle between the front portion of the conveyor means and the front side of the frame members is increased raising the conveyor means. Alternatively the carriage means includes front frame and rear frame members pivotally attached at their upper ends to the conveyor means, where the front frame member has pivotally interconnected upper and lower frame members forming a forward acute angle. The upper front frame member has attached cradle means to receive one end of the hydraulic cylinder. The other end is operatively associated with the front end of the conveyor means so that when the hydraulic cylinder means is extended the angle between the front portion of the conveyor means and the upper front frame member is increased raising the conveyor means. A third version has the carriage means including front frame and rear frame members pivotally attached at their upper ends to the conveyor means, where the front frame member has pivotally interconnected upper and lower frame members forming a forward acute angle. The hydraulic cylinder is however has one end attached to the upper front frame member and the other attached to the front frame member, so that when the hydraulic cylinder means is extended the forward acute angle between the upper and lower front frame members is increased raising the conveyor means. A fourth variation has the front frame member having pivotally interconnected upper and lower frame members forming a rearward acute angle. Here the hydraulic cylinder means has one end attached to the upper front frame member and the other attached to the lower front frame member, so that when the hydraulic cylinder means is extended the rearward acute angle between the upper and lower front frame members is increased raising the conveyor means. When there are front and rear frame members these are pivotally attached at their lower ends to each other. Basically powered lift means is provided for a height adjustable elevator means having elongated conveyor means to convey material and carriage means to support the elevator means having at least one frame member pivotally attached at its upper end to the conveyor means, to raise one end of the elongated conveyor means, which includes the hydraulic cylinder means of the invention. Although the hydraulic cylinders as currently mounted in this broad aspect generally have their pistons extending downward, this is not necessary for the practice of this aspect of the invention. The cylinders may be mounted to extend the pistons upward without affecting the practice of the invention, as those skilled in the art would realize.

In another broad aspect the invention is directed to a height adjustable elevator means having elongated conveyor means to convey material and carriage means to support the conveyor means having front and rear frame members pivotally attached together adjacent their bases, and pivotally attached at their upper ends to the conveyor means. The front frame member has lower frame means and pivotally attached shoe means slidably mounted in longitudinal track means on the front portion of the conveyor means. The upper end of the rear frame member is fixedly pivotally mounted on the rear portion of the conveyor means. There are flexible cable means attached at one end to the upper end of the front frame member to draw it toward the rear frame member to raise the conveyor means and also to allow the upper ends of the frame member to move away from each other to lower the conveyor means. The flexible cable means is attached at the other end to hydraulic cylinder means having head and rod ends, and reciprocable piston means having associated piston rod means and operatively associated hydraulic line means attachable to vehicle hydraulic system means. The hydraulic cylinder means has front sheave means attached to the piston rod means and rear sheave means adjacent the head end of the hydraulic cylinder means. The flexible cable means passes from upper end of the front frame member around the rear sheave means then around the front sheave means to anchor means rearward of the hydraulic cylinder means, whereby extension of the cylinder piston means draws the front frame member toward the rear frame member. The improvement provides piston means including checkvalve means which prevent flow through the piston means from head side to rod side allowing head side hydraulic pressure to extend the cylinder, and allowing flow from rod side to head side preventing rod side hydraulic pressure retracting the cylinder, whereby the extra volume of hydraulic fluid necessary to extend the cylinder approximates that of the piston rod means. The front frame member may comprise lower frame means, lift assist means, and shoe means slidably mounted in longitudinal track means on the conveyor means, where the lift assist means is pivotally attached to the shoe means and independently pivotally attached to the lower frame means and the flexible cable means is attached to the lift assist means. Preferably each sheave means comprises a plurality of sheaves, more preferably triple. Preferably there are two flexible cable means attached at one end to upper end of the front frame member and each the flexible cable means is attached at the other end to separate hydraulic cylinder means.

In another broad aspect the invention is directed to an improved height adjustable elongated tube means having carriage means to support the tube means. The carriage means has front and rear frame members pivotally attached together adjacent their bases, and pivotally attached at their upper ends to the tube means. The front frame member has lower frame means and pivotally attached shoe means slidably mounted in longitudinal track means on the front portion of the tube means. The upper end of the rear frame member is fixedly pivotally mounted on the rear portion of the tube means. Flexible cable means are attached at one end to the upper end of the front frame member to draw it toward the rear frame member to raise the tube means and also to allow the upper ends of the frame members to move away from each other to lower the tube means. The flexible cable means are attached at the other end to hydraulic cylinder means having head and rod ends, and reciprocable piston means having associated piston rod means and operatively associated hydraulic line means attachable to vehicle hydraulic system means. The hydraulic cylinder means have front triple sheave means attached to the piston rod means and rear triple sheave means adjacent the head end of the hydraulic cylinder means. The flexible cable means passes from the upper end of the front frame member around the rear sheave means then around the front sheave means to anchor means rearward of the hydraulic cylinder means, whereby extension of the cylinder piston means draws the front frame member toward the rear frame member. The improvement provides the piston means including checkvalve means, the checkvalve means preventing flow through the piston means from head side to rod side allowing head side hydraulic pressure to extend the cylinder, and allowing flow from rod side to head side preventing rod side hydraulic pressure retracting the cylinder, whereby the extra volume of hydraulic fluid necessary to extend the cylinder approximates that of the piston rod means. The front frame member may comprise lower frame means, lift assist means, and shoe means slidably mounted in longitudinal track means on the tube means. The lift assist means is pivotally attached to the shoe means and independently pivotally attached to the lower frame means and the flexible cable means is attached to the lift assist means. Alternatively the front frame member may comprise lower frame means and pivotally attached shoe means slidably mounted in longitudinal track means on the tube means, while the flexible cable means is attached to the shoe means. Preferably each sheave means comprises a plurality of sheaves, preferably triple. Preferably there are two flexible cable means attached at one end to the front frame member and each flexible cable means is attached at the other end to separate hydraulic cylinder means.

To raise the auger tube, hydraulic pressure is applied to the head end of the cylinder and the piston forced rodward, typically a hydraulic pressure of 800 to 1600 psi is applied. This raises the auger tube and holds it in position during use. Generally the hydraulic pressure is removed to lower the auger, whereupon gravity pushes down the auger tube and retracts the piston. Should hydraulic pressure be reversed, the internal checkvalve equalizes the pressure on either side of the cylinder, leaving a slight rodward force due to the hydraulic pressure applied by the fluid opposite the piston rod. The weight of the auger tube however retracts the piston.

The checkvalve inside the cylinder prevents hydraulic pressure being applied the wrong way, also it brakes the auger on lowering, if the piston moves too fast the head side pressure will close the checkvalve and slow the piston. If hydraulic pressure is applied to the rod side of the cylinder the fluid will flow through the checkvalve and equalize the pressure. The internal checkvalve prevents tampering and/or erroneous assembly or replacement of the checkvalve, which would be easier with an external checkvalve.

As those skilled in the art appreciate considerable variation in auger and hydraulic cylinder size are possible, within the limits of the invention. While typically the auger tubes range from about 8 to 13 inches in diameter and about 50 to about 70 feet in length and the cylinders are about 4 inches in diameter, as those skilled in the art would appreciate, greater and lesser values may be used.

DESCRIPTION OF THE PREFERRED EMBODIMENTS

Figure 1:
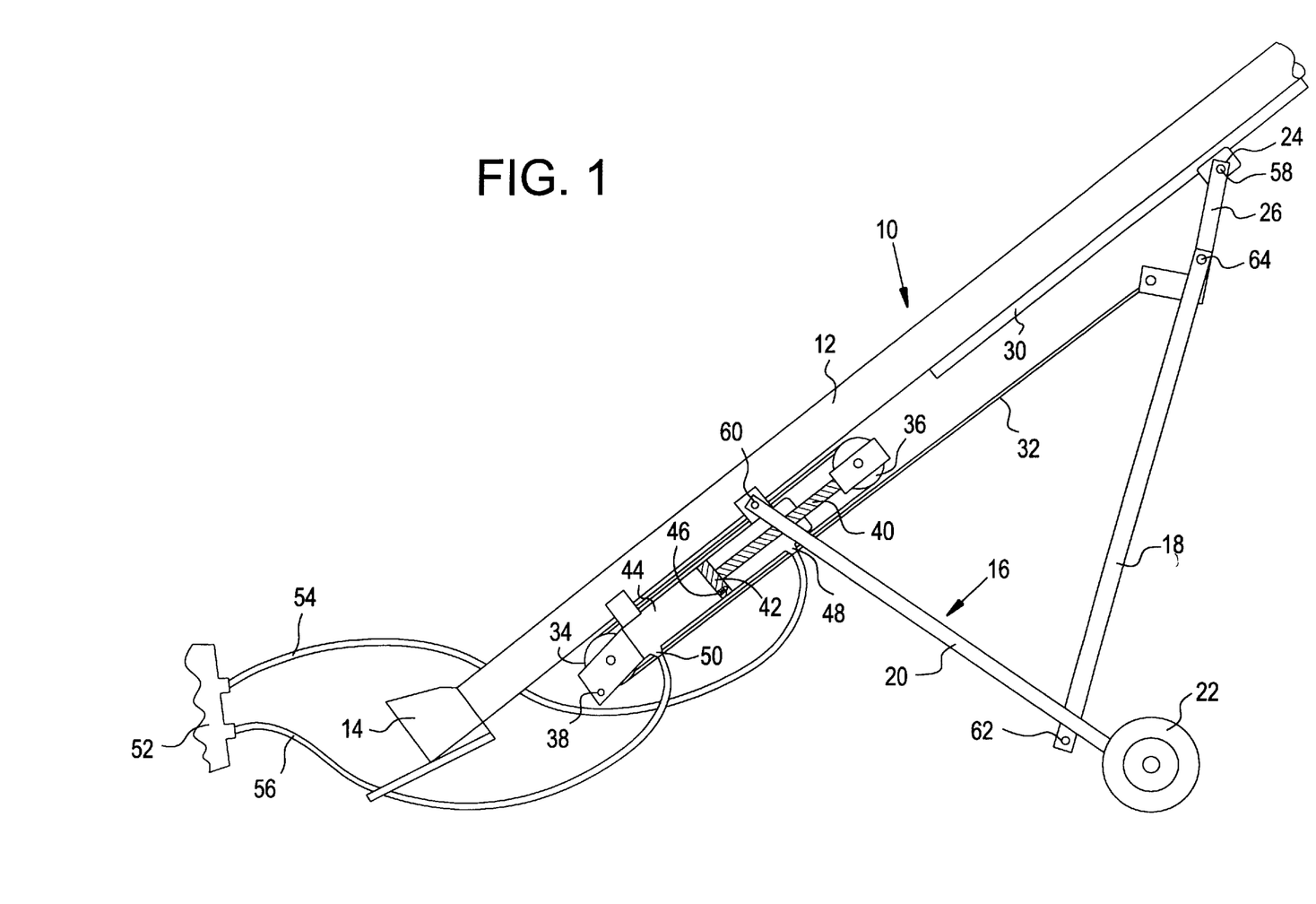
FIG. 1 is a schematic side elevational part sectional view of an embodiment of the invention.
Figure 2:
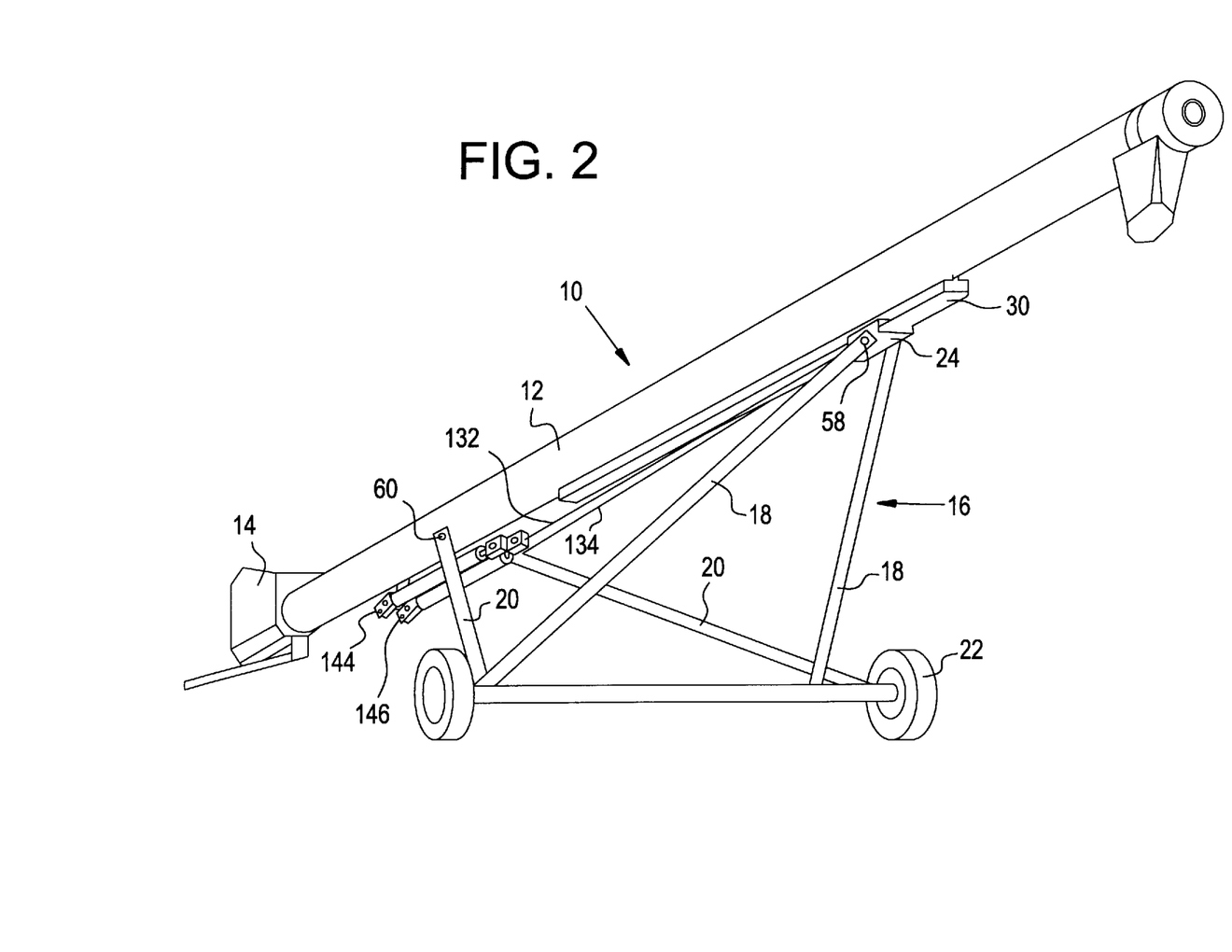
FIG. 2 is a schematic perspective front view of another embodiment.
Figure 3:
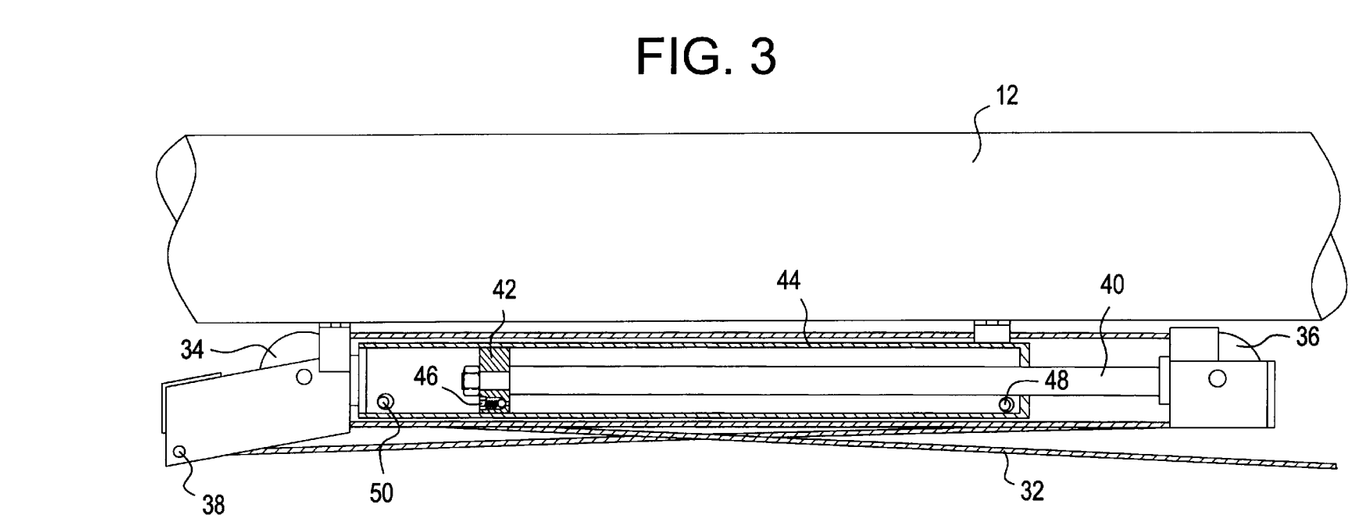
FIG. 3 is a detailed sectional view of the embodiment of FIG. 1.
Figure 4:
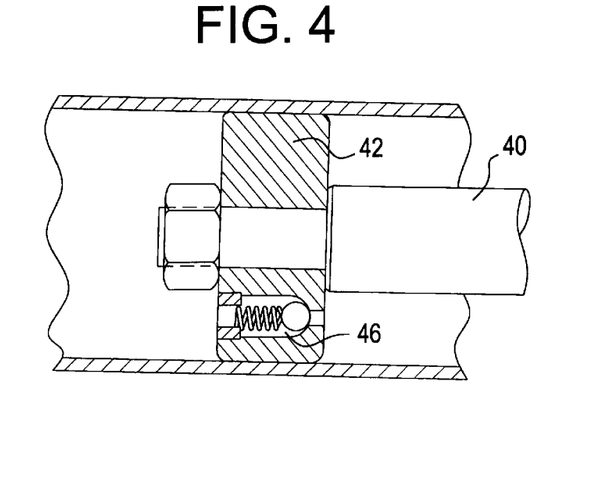
FIG. 4 is a detailed sectional view of the embodiment of FIG. 3.

The invention is now illustrated by reference to the preferred embodiments thereof. Numeral 10 indicates an elevatable grain auger, as shown it in raised position, having elongated tube 12 containing the auger driven through gearbox 14 by tractor PTO (power take off) not shown. In FIGS. 1 and 2, tube 12 is carried by carriage 16 which has paired from front legs 18, paired rear legs 20, and wheels 22. Front legs 18 are connected to roller trackshoe 24, either through lift assist 26 (FIG. 1) or directly (FIG. 2). Trackshoe 24 is slidably mounted in track or slide 30. Single cable 32 (FIG. 1) is connected to lift assist 26 (FIG. 1), and passes around rear triple pulley 34 and front triple pulley 36, three times before attachment to anchor 38. Front triple pulley 36 is mounted on piston rod 40 of piston 42 of hydraulic cylinder 44. Piston 42 has therein checkvalve 46, allowing flow from rod to head but not the reverse flow from head to rod. Cylinder 44 has rod port 48 and head port 50, connected during use to tractor 52's hydraulic system by hydraulic lines 54 and 56. Carriage 16 is pivoted to trackshoe 24 at trackshoe pivot 58, to tube 12 at tube pivot 60, and to itself at frame pivot 62, optionally front legs 18 may be attached to lift assist 26 at lift assist pivot 64. A double cable system is shown in FIG. 2, where cables 132 and 134 are controlled by paired cylinders 144 and 146.

Figure 5:
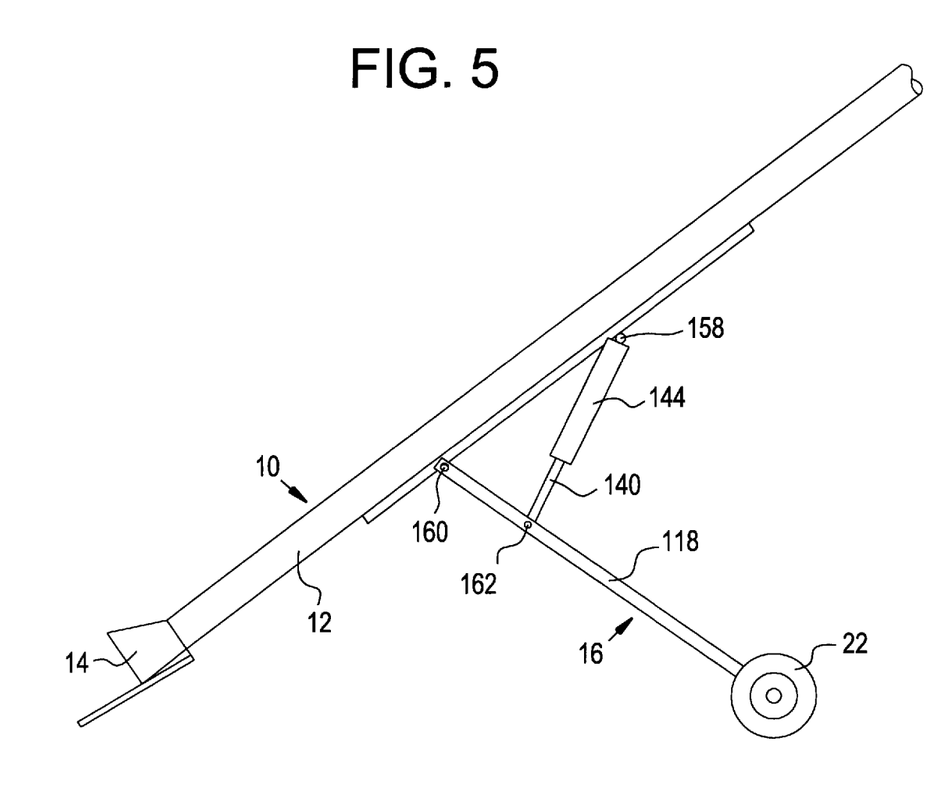
FIGS. 5 to 8 are schematic side elevational views of further embodiments of the invention.
Figure 6:
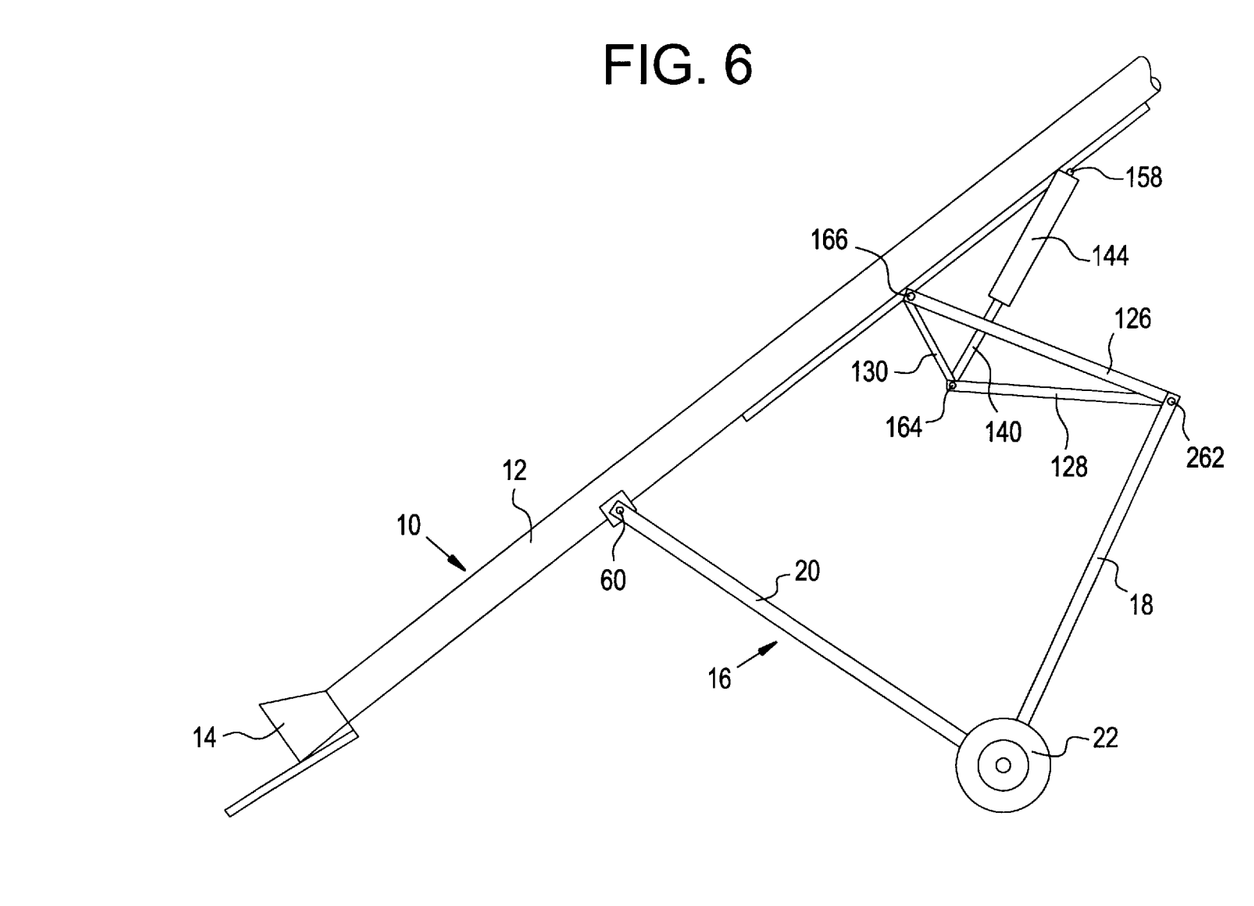
Figure 7:
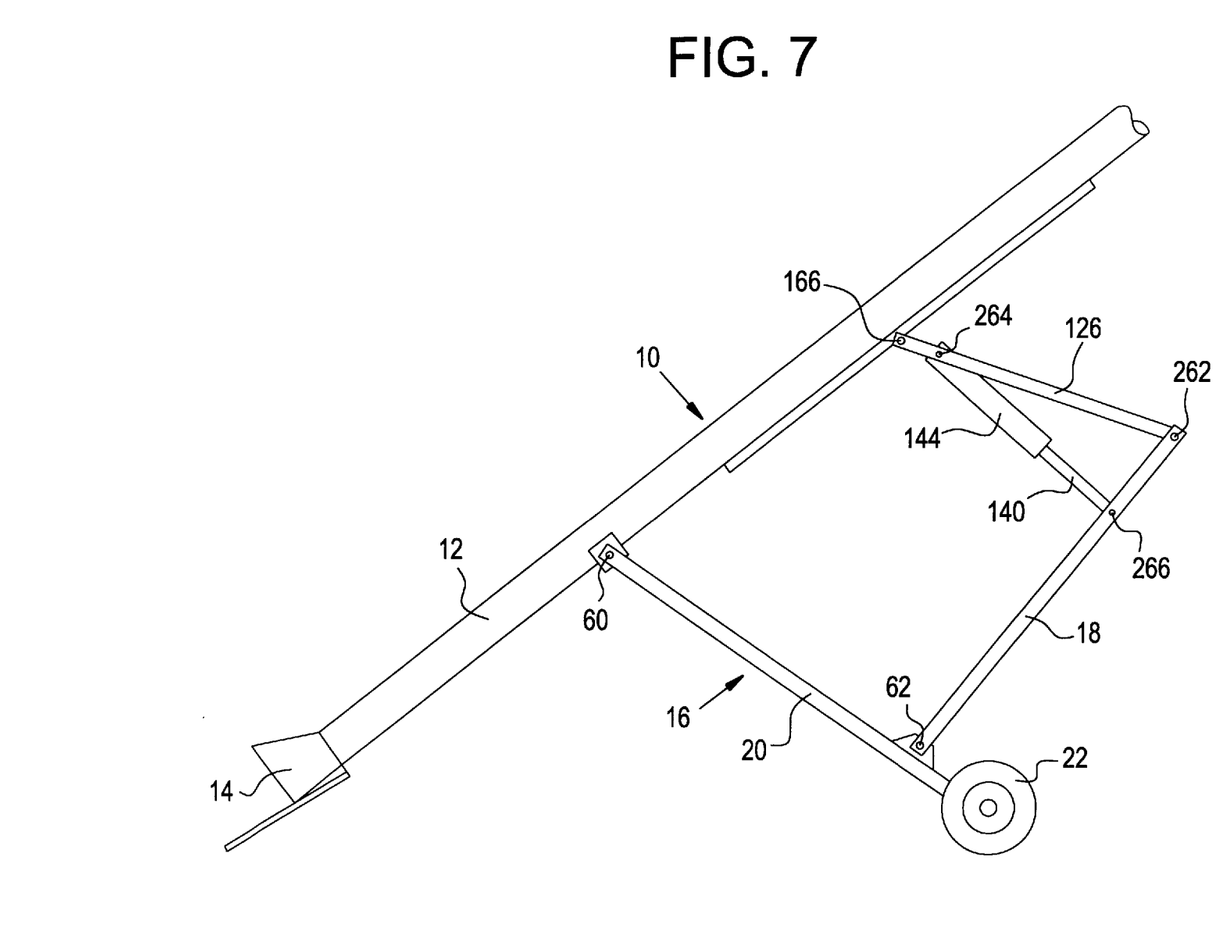
Figure 8:
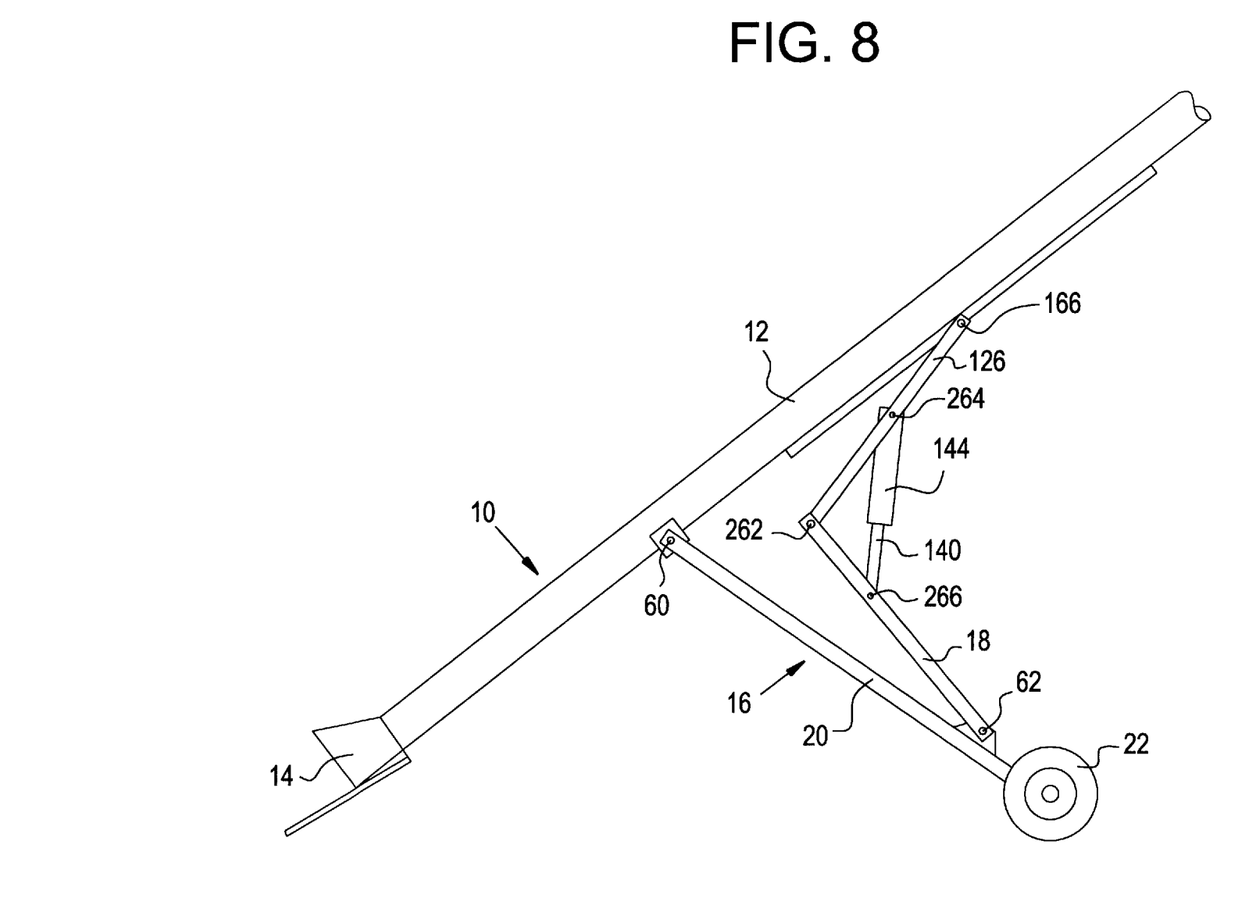

In FIG. 5, tube 12 is carried by carriage 16 which has paired legs 118, and wheels 22. Legs 118 are pivoted to tube 12 at rear tube pivot 160, cylinder(s) 144 pivot by piston rod 140 at rod end to legs 118 by leg pivot 162, and at head end to tube 12 by front tube pivot 158. In FIG. 6, tube 12 is carried by carriage 16 which has paired front legs 18, paired rear legs 20, and wheels 22. Rear legs 20 pivot on tube 12 by tube pivot 60. Front legs 18 are connected to lever arms 126, pivoted to tube 12 by tube pivot 166, and front legs 18 by frame pivot 262. Support arms 128 and 130 join at arm pivot 164. Cylinder 144 is pivoted at head end by tube pivot 158 and at rod end by arm pivot 164. In FIG. 7, tube 12 is carried by carriage 16 which has paired front legs 18, paired rear legs 20, and wheels 22. Rear legs 20 pivot on tube 12 by tube pivot 60. Front legs 18 are connected to lever arms 126, pivoted to tube 12 by tube pivot 166, and front legs 18 by frame pivot 262. Cylinder 144 is pivoted by at head end lever arm pivot 264, and at rod end by front leg pivot 266. In FIG. 8, tube 12 is carried by carriage 16 which has paired front legs 18, paired rear legs 20, and wheels 22. Rear legs 20 pivot on tube 12 by tube pivot 60. Front legs 18 are connected to lever arms 126, pivoted to tube 12 by tube pivot 166, and front legs 18 by frame pivot 262. Cylinder 144 is pivoted at head end by lever arm pivot 264, and at rod end by front leg pivot 266.

In use the head side and the rod side of the cylinder and both connecting lines are full of hydraulic fluid, when connected to tractor 52. The fluid is pumped up line 56 to the head end of cylinder 44, 144 or 146, urging checkvalve 46 closed and piston 42 extended, which continues until the piston is fully extended. In FIG. 1 cable 32 is tautened and shortened reducing the angle between legs 18 and 20, and elevating tube 12. In FIG. 2, cables 132 and 134 are also tautened and shortened, narrowing the angle between legs 18 and 20 and elevating tube 12. In FIGS. 5 to 8, cylinders 144 are extended, either raising tube 12 directly (FIG. 5) or straightening the leg 18 and lever arm 126 (FIGS. 6 to 8) and thus raising tube 12 directly. When fluid flow is stopped checkvalve 46 remains closed due to downward pressure of auger tube 12. When fluid flow is reversed checkvalve 46 may open as necessary equalizing pressure on either side of piston 42, preventing undesirable rod side pressure within hydraulic cylinder 44. The retraction of piston rod 40 occurs solely under the weight of the auger. An advantage of the invention is that the tractor hydraulic system only needs to supply the fluid necessary to displace the piston rod 40, rather than fill cylinder 44 as formerly. A 56 inch stroke, 4 inch diameter cylinder with a 1¾ inch diameter piston rod requires about 2.21 liters of hydraulic fluid under the new system, as opposed to 11.53 liters under the old. When the dual cylinder system is used, 4.42 liters are required rather than 23.06 liters. This means tractors with smaller hydraulic fluid reservoirs can be used with grain augers of the invention. Also the tractor hydraulic reservoir remains relatively full to allow operating other equipment without first needing to adjust the hydraulic fluid level in the reservoir.

Although the hydraulic cylinders as illustrated in FIGS. 5 to 8 have their pistons extending downward, this is not necessary for the practice of these embodiments of the invention. The cylinders may be mounted to extend the pistons upward without affecting the practice of these embodiments of the invention, as those skilled in the art will realize.

As those skilled in the art would realize these preferred described details and materials and components can be subjected to substantial variation, modification, change, alteration, and substitution without affecting or modifying the function of the described embodiments.

Although embodiments of the invention have been described above, it is not limited thereto, and it will be apparent to persons skilled in the art that numerous modifications and variations form part of the present invention insofar as they do not depart from the spirit, nature and scope of the claimed and described invention.

I claim:

1. In a height adjustable elevator having an elongated conveyor for material and a carriage to support said elevator having front and rear frame members pivotally attached together adjacent their bases, and pivotally attached at their upper ends to said conveyor, said upper ends of said front and rear frame members being movable toward and away from each other at least one flexible cable attached at one end to one said frame member adjacent the upper end thereof to draw said upper ends of said frame members toward each other to raise said conveyor and to allow said upper ends of said frame members to move away from each other to lower said conveyor, said flexible cable being attached at said other end to a hydraulic cylinder having head and rod ends, and a reciprocable piston having associated piston rod and operatively associated hydraulic lines attachable to the hydraulic system of a vehicle the improvement comprising said piston including at least one checkvalve preventing flow through said piston from head side to rod side allowing head side hydraulic pressure to extend said cylinder, and allowing flow from rod side to head side preventing rod side hydraulic pressure retracting said cylinder, whereby the extra volume of hydraulic fluid necessary to extend said cylinder approximates that of the piston rod.

2. Elevator of claim 1, wherein said carriage includes a traversing frame member and a fixed frame member, the lower end of said traversing frame member being pivotally attached to the lower end of said fixed frame member, said upper end of said fixed frame member being fixedly pivotally attached to said conveyor said upper end of said traversing frame member being pivotally attached to said conveyor in longitudinally movable supporting contact.

3. Elevator of claim 2, wherein said traversing frame member comprises a lower frame member and a pivotally attached shoe slidably mounted in a longitudinal track on said conveyor, and said flexible cable is attached to said shoe.

4. Elevator of claim 2, wherein said traversing frame member comprises a lower frame member, a lift assist member, and a shoe slidably mounted in a longitudinal track on said conveyor, said lift assist member being pivotally attached to said shoe and independently pivotally attached to said lower frame member and said flexible cable is attached to said lift assist member.

5. Elevator of claim 1, wherein there are two said flexible cables attached at one end to one said frame member, and each said flexible cables is attached at the other end to separate hydraulic cylinders.

6. Elevator of claim 3, wherein said traversing frame member is at the front of said conveyer and said fixed frame member is at the rear of said conveyer and said longitudinal track is on the front portion of said conveyor, said hydraulic cylinder having a front sheave attached to said piston rod and a rear sheave adjacent said head end of said hydraulic cylinder, said flexible cable passing from said upper end of said front frame member around said rear sheave then around said front sheave to an anchor rearward of said hydraulic cylinder, whereby extension of said cylinder piston draws said front frame member toward said rear frame member.

7. Elevator of claim 6, wherein each said sheave is multiple.

8. Elevator of claim 6, wherein said front frame member comprises a lower frame member, a lift assist member, and a shoe slidably mounted in a longitudinal track on said conveyor, said lift assist member being pivotally attached to said shoe and independently pivotally attached to said lower frame member and said flexible cable is attached to said lift assist member.

9. Elevator of claim 8, wherein each said sheave is multiple.

10. Elevator of claim 6, wherein there are two said flexible cable attached at one end to said front frame member and each said flexible cable is attached at the other end to separate hydraulic cylinder.

11. In a height adjustable elongated tube having a carriage to support said tube, said carriage having front and rear frame members pivotally attached together adjacent their bases, and pivotally attached at their upper ends to said tube,
   said front frame member having a lower frame member and a pivotally attached shoe slidably mounted in a longitudinal track on the front portion of said tube, said upper end of said rear frame member being fixedly pivotally mounted on the rear portion of said tube,
   at least one flexible cable attach ed at one end to said upper end of said front frame member to draw said upper end of said front frame member toward said rear frame member to raise said tube and to allow said upper ends of said frame members to move away from each other to lower said tube,
   said flexible cable being attached at said other end to a hydraulic cylinder having head and rod ends, and reciprocable piston having associated piston rod and operatively associated hydraulic lines attachable to the hydraulic system of a vehicle,
   said hydraulic cylinder having a front sheave attached to said piston rod and a rear sheave adjacent said head end of said hydraulic cylinder,
   said flexible cable passing from said upper end of said front frame member around said rear sheave then around said front sheave to an anchor rearward of said hydraulic cylinder, whereby extension of said cylinder piston draws said front frame member toward said rear frame member,
   the improvement comprising said piston including a checkvalve preventing flow through said piston from head side to rod side allowing head side hydraulic pressure to extend said cylinder, and allowing flow from rod side to head side preventing rod side hydraulic pressure retracting said cylinder, whereby the extra volume of hydraulic fluid necessary to extend said cylinder approximates that of the piston rod.

12. Tube of claim 11, wherein said front frame member comprises a lower frame member, a lift assist member, and a shoe slidably mounted in a longitudinal track on said tube, said lift assist member being pivotally attached to said shoe and independently pivotally attached to said lower frame member and said flexible cable is attached to said lift assist member.

13. Tube of claim 11, wherein said flexible cable is attached to said shoe.

14. Tube of claim 11, wherein there are two said flexible cables attached at one end to said front frame member and each said flexible cable is attached at the other end to separate hydraulic cylinders.

15. A height adjustable elevator having an elongated conveyor to convey material and a carriage to support said elevator having at least one frame member pivotally attached at its upper end to said conveyor,
   and a powered lift to raise the front end of said elongated conveyor
   said powered lift including at least one hydraulic cylinder having head and rod ends, and a reciprocable piston having associated piston rod and operatively associated hydraulic lines attachable to the hydraulic system of a vehicle
   the improvement comprising said piston including checkvalve preventing flow through said piston from head side to rod side allowing head side hydraulic pressure to extend said cylinder, and allowing flow from rod side to head side preventing rod side hydraulic pressure alone retracting said cylinder, whereby the extra volume of hydraulic fluid necessary to extend said cylinder approximates that of the piston rod.

16. Elevator of claim 15 having paired frame members and said hydraulic cylinder has one end attached to the portion of said conveyor in front of said paired frame members, and the other end operatively associated with the front side of said paired frame members spaced apart from said conveyor, so that when said hydraulic cylinder is extended the angle between the front portion of said conveyor and said front side of said frame members is increased raising said conveyor.

17. Elevator of claim 15 front frame and rear frame members pivotally attached at their upper ends to said conveyor,
   said front and rear frame members being pivotally attached at their lower ends to each other,
   said front frame member having pivotally interconnected upper and lower frame members forming a forward acute angle, said upper front frame member having an attached cradle,
   said hydraulic cylinder having one end attached to the portion of said conveyor in front of said upper frame member, and the other end operatively associated with the upper front frame cradle, so that when said hydraulic cylinder is extended the angle between the front portion of said conveyor and said upper front frame member is increased raising said conveyor.

18. Elevator of claim 15 having front frame and rear frame members pivotally attached at their upper ends to said conveyor,
   said front and rear frame members being pivotally attached at their lower ends to each other,
   said front frame member having pivotally interconnected upper and lower frame members forming a forward acute angle,
   said hydraulic cylinder having one end attached to the upper front frame member and the other end attached to said lower front frame member, so that when said hydraulic cylinder is extended the forward acute angle between the upper and lower front frame members is increased raising said conveyor.

19. Elevator of claim 15 having front frame and rear frame members pivotally attached at their upper ends to said conveyor,
   said front and rear frame members being pivotally attached at their lower ends to each other,
   said front frame member having pivotally interconnected upper and lower frame members forming a rearward acute angle, said upper front frame member having an attached cradle
   said hydraulic cylinder having one end attached to the upper front frame member attached to said lower front frame member, so that when said hydraulic cylinder is extended the rearward acute angle between the upper and lower front frame members is increased raising said conveyor.

* * * * *